US008429258B2

(12) United States Patent
Jennings et al.

(10) Patent No.: US 8,429,258 B2
(45) Date of Patent: Apr. 23, 2013

(54) USING UNIQUE LOCAL UNICAST ADDRESSES IN A GLOBAL DOMAIN NAME SERVER BY PROVIDING A CENTRALIZED REGISTRY

(75) Inventors: Seth D. Jennings, Austin, TX (US); Roocha K. Pandya, Mumbai (IN); Prashant A. Paranjape, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/445,972

(22) Filed: Apr. 13, 2012

(65) Prior Publication Data

US 2012/0198095 A1 Aug. 2, 2012

Related U.S. Application Data

(63) Continuation of application No. 12/851,737, filed on Aug. 6, 2010.

(51) Int. Cl.
*G06F 15/177* (2006.01)

(52) U.S. Cl.
USPC .......................................... 709/222; 709/220

(58) Field of Classification Search .......... 709/220–223, 709/245
See application file for complete search history.

(56) References Cited

U.S. PATENT DOCUMENTS

| 7,609,689 | B1 | 10/2009 | Desanti et al. |
| 7,706,374 | B2 | 4/2010 | Huang |
| 2003/0046428 | A1* | 3/2003 | Elg et al. ....................... 709/245 |
| 2005/0086373 | A1 | 4/2005 | Banerjee et al. |
| 2006/0048163 | A1 | 3/2006 | Bessis |
| 2006/0200561 | A1 | 9/2006 | Tsuhara et al. |
| 2006/0291422 | A1 | 12/2006 | Rochford |
| 2007/0253431 | A1 | 11/2007 | Park et al. |
| 2009/0285216 | A1 | 11/2009 | Thubert et al. |
| 2010/0274668 | A1* | 10/2010 | Langston et al. .......... 705/14.55 |
| 2010/0274910 | A1* | 10/2010 | Ghanaie-Sichanie et al. ............................ 709/229 |
| 2010/0332623 | A1 | 12/2010 | Suzuki |
| 2012/0036179 | A1 | 2/2012 | Hegde et al. |
| 2012/0036241 | A1 | 2/2012 | Jennings et al. |

OTHER PUBLICATIONS

U.S. Appl. No. 12/851,689, 1 page.
U.S. Appl. No. 12/851,737, 1 page.
Office Action mailed Sep. 27, 2012 for U.S. Appl. No. 12/851,737; 17 pages.
Office Action mailed Dec. 7, 2012 for U.S. Appl. No. 12/851,689; 14 pages.
Response to Office Action filed with the USPTO on Dec. 12, 2012 for U.S. Appl. No. 12/851,737, 12 pages.

* cited by examiner

*Primary Examiner* — Joshua Joo
(74) *Attorney, Agent, or Firm* — Stephen J. Walder, Jr.; Libby Z. Toub

(57) ABSTRACT

Mechanisms are provided for assigning addresses for use in communications between computing devices. With these mechanisms, a centralized domain name registrar server assigns a unique global identifier to a domain of a site such that the unique global identifier uniquely identifies the domain. The unique global identifier is received in a data processing system from the centralized domain name registrar server. The site is divided into a plurality of sub-domains and a unique sub-domain identifier is assigned to each sub-domain in the site such that the unique sub-domain identifier uniquely identifies a corresponding sub-domain in the site. The global identifier for the domain of the site and the sub-domain identifiers of the sub-domains in the plurality of sub-domains are provided by the data processing system to routers of the site for use in associating addresses with devices of the site.

16 Claims, 6 Drawing Sheets

USING UNIQUE LOCAL UNICAST ADDRESSES IN A GLOBAL DOMAIN NAME SERVER BY PROVIDING A CENTRALIZED REGISTRY

This application is a continuation of application Ser. No. 12/851,737, filed Aug. 6, 2010, status pending.

BACKGROUND

The present application relates generally to an improved data processing apparatus and method and more specifically to mechanisms for using unique local unicast addresses in a global domain name server by providing a centralized registry.

Internet Protocol version 6 (IPv6) is an Internet Protocol version which is designed to succeed IPv4. IPv6 is an Internet Layer protocol for packet switched internetworks. The main driving force for the redesign of the Internet Protocol is the foreseeable IPv4 address exhaustion. IPv6 has a vastly larger address space than IPv4 due to the use of a 128-bit address as opposed to the IPv4 addresses that use only 32 bits.

In December of 1995, the IPv6 RFC 1884, directed to an IPv6 addressing architecture, defined the address block fec0::/10 as site-local addresses that could be used within a "site" for private IPv6 networks. However, there was an insufficient definition of the term "site" which led to confusion over the resulting routing rules. Subsequently, in September 2004, RFC 3879 was published in which this site-local address range was deprecated and solutions to its problems were postulated. In October 2005, in RFC 4193, a unique local unicast (ULU) address block was defined for use in private IPv6 networks. Essentially the unique local unicast address (ULUA) block was defined to replace the site-local addresses. The IPv6 RFC 4193 is available at http://tools.ietf.org/html/rfc4193.

As specified in section 5 of the RFC 4193, the prefixes of ULUA addresses are not mathematically guaranteed to be unique. Thus, there is the possibility that, if such ULUA addresses were to be used as global addresses for routing between sites, a collision may occur. A collision is when more than one device uses the same address and as a result, routing of data packets may be made to an incorrect device. That is, for example, there is a small possibility that the same locally assigned IPv6 local address will be used by two different organizations both claiming to be authoritative. In this scenario, it is likely there will be a connection attempt to the closest host with the corresponding locally assigned IPv6 local address. This may result in connection timeouts, connection failures indicated by ICMP Destination Unreachable messages, or successful connections to the wrong host machine. As a result, the ULUA addresses are not added to global domain name servers (DNS's) and are not routable in the global IPv6 Internet, but instead are only routable within a private network or between a limited set of sites.

SUMMARY

In one illustrative embodiment, a method, in a data processing system, is provided for assigning addresses for use in communications between computing devices. The method comprises assigning, by a centralized domain name registrar server, a unique global identifier to a domain of a site such that the unique global identifier uniquely identifies the domain. The method further comprises receiving the unique global identifier in the data processing system from the centralized domain name registrar server. The method also comprises dividing the site into a plurality of sub-domains. Furthermore, the method comprises assigning a unique sub-domain identifier to each sub-domain in the site such that the unique sub-domain identifier uniquely identifies a corresponding sub-domain in the site. Moreover, the method comprises providing the global identifier for the domain of the site and the sub-domain identifiers of the sub-domains in the plurality of sub-domains to routers of the site for use in associating addresses with devices of the site.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
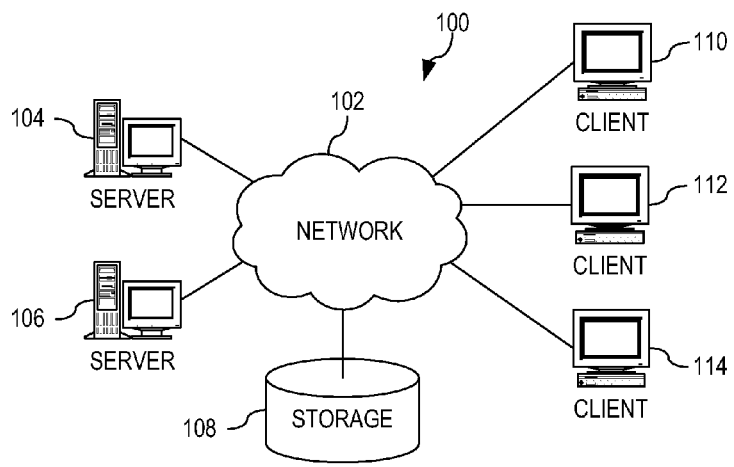
FIG. 1 is an example diagram of a distributed data processing system in which aspects of the illustrative embodiments may be implemented.

The illustrative embodiments provide a mechanism for using a unique local unicast (ULU) address in a global domain name server (DNS) by providing a small portion of source code modification to a resolver module. The mechanisms of the illustrative embodiments provide a new directive in the resolver module that specifies the domains that make up a site. The resolver making name queries receives responses from DNS servers which contains the normal unicast addresses as well as the ULU addresses. The resolver compares the ULU addresses to the domains of the site retrieved using the new directive in the resolver to determine if the ULU address is within the same site as the resolver or not. If so, then the ULU address can be used with local communications within the site. If there the ULU addresses returned from the DNS servers are not in the same site as the resolver, then ULU addresses belong to those domains which are outside the scope of the resolver site and the resolver filters out these ULU addresses before presenting a result of the DNS lookup operation to the user program or the application program that requested this name resolution.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
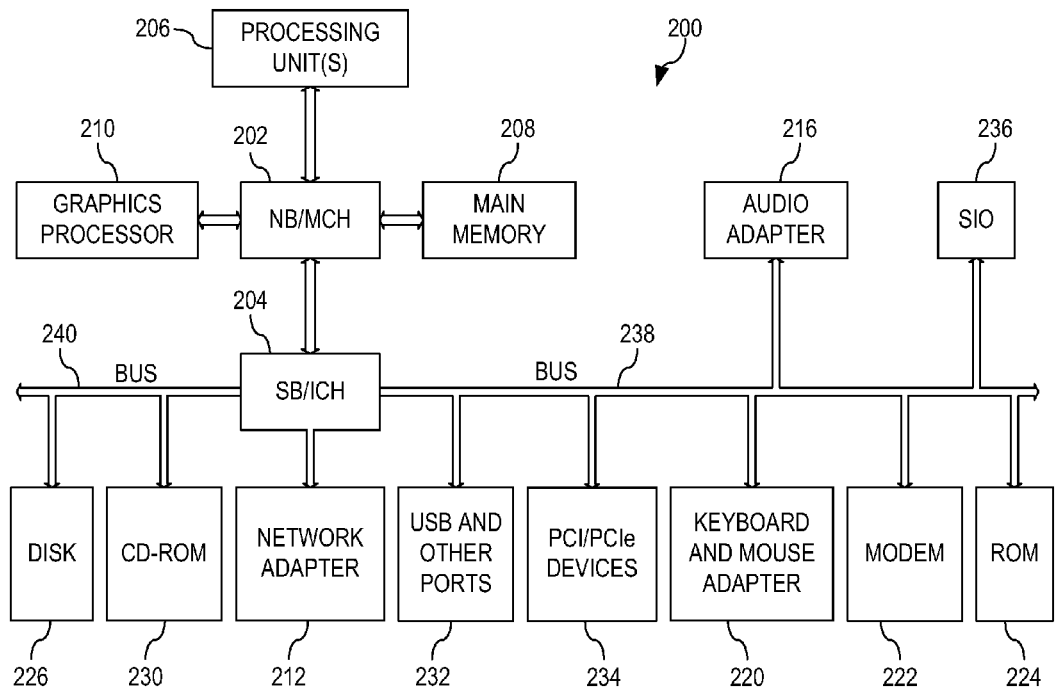
FIG. 2 is an example diagram of a data processing device in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
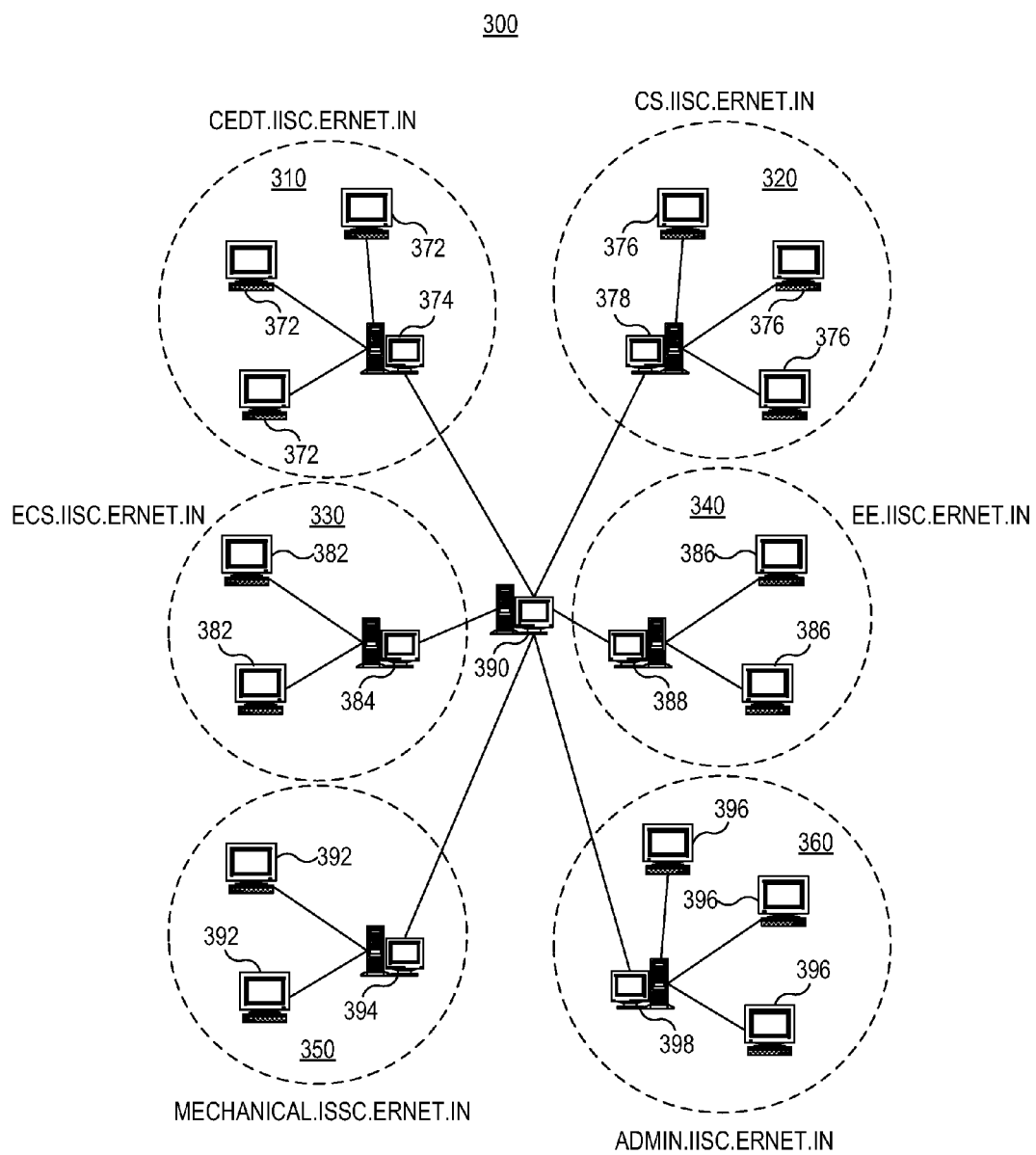
FIG. 3 is an example diagram of a site having a plurality of domains in accordance with one illustrative embodiment.

The distributed data processing system shown in FIG. 1 may represent a wide area network, such as the Internet, a local area network, or other type of networked data processing system. Such systems are typically used in various types of distributed organizations. As is generally known, large sites, such as multinational companies, large universities with many departments, and other organizational affiliations of networked electronic devices, may have many domain name system (DNS) domains created internally. For example, as shown in FIG. 3, a site, which is defined as a organizational affiliation of networked electronic devices, may be comprised of multiple domains 310-360 with each domain comprising one or more client electronic devices 372, 376, 382, 386, 392, and 396 and zero or more server computing devices 374, 378, 384, 388, 394, and 398. In the depicted example, a site, such as the Indian Institute of Science, Bangalore, India, has domains of cedt.iisc.ernet.in 310, cs.iisc.ernet.in 320, ecs.iisc.ernet.in 330, ee.iisc.ernet.in 340, mechanical.issc.ernet.in 350, and admin.iisc.ernet.in 360. All of these domains 310-360 together constitute the I.I.Sc. site 300 as a whole. A site is not a fixed boundary but is defined by the organization either automatically, manually, or semi-automatically. Site scope addresses need to be unique over the topological span of the site boundary. Site border routers will not transmit such site-local addresses from one site into another. Sites scopes are typically at least larger than link local scope and less than global scope.

The server computing devices 374, 378, 384, 388, 394, and 398 may, among other functionality, operate as local name servers for resolving domain names that use local addresses, such as unique local unicast addresses. Alternatively, the name server may be a separate server, such as server 390, that is a global name server that provides global scope domain name resolution but is also configured to return local addresses in accordance with the mechanisms of the illustrative embodiments, as described hereafter.

As mentioned above, the illustrative embodiments provide mechanisms for allowing global domain name system (DNS) servers, such as one or more of servers 104 or 106 in FIG. 1 or server 390 in FIG. 3, to register local addresses, such as unique local unicast (ULU) addresses, i.e. local addresses that are meant for routing of communications within a site. Moreover, the mechanisms of the illustrative embodiments provide an ability to have Fully Qualified Domain Names (FQDNs) corresponding to such ULU addresses returned in responses to name queries. In this way, the ULU address may be utilized by DNS resolver modules, such as may be present on one or more client computing devices 110-114 in FIG. 1, or client devices or server devices in the various domains 310-360 of FIG. 3, for example, to obtain FQDNs for the ULU addresses and determine which ULU addresses are appropriate for the domain of the requesting host system when presenting results to requesting applications for purposes of communications with site devices. That is, the illustrative embodiments provide the DNS resolver module, referred to herein also simply as the "resolver" or "resolver module," in the requesting device, i.e. the device requesting a name lookup in the DNS server, with enough information to properly determine the reachability of a ULU address returned in a DNS query via an addition to the resolver configuration.

One of the main issues addressed by the mechanisms of the illustrative embodiments is the way in which the resolver knows that a ULU address is reachable on the network, or site, to which it is connected. The resolver allows a computer connected to a network to convert alpha-numeric domain names into the numeric Internet Protocol (IP) addresses that are required for access to resources on the Internet, a local area network, wide area network, or other distributed data processing network environment. The process of looking up IP addresses based on alpha-numeric domain names using a resolver is referred to as "resolving" the IP address.

The resolver typically contains directives with the IP addresses of DNS servers available to the host system in which the resolver is present. These directives allow the resolver to determine what DNS servers to access when trying to resolve a domain name into an IP address. The illustrative embodiments provide a new directive, e.g., a directive "domains-within-site," in the resolver, e.g., in the resolver configuration file (resolv.conf), that allows the resolver to retrieve a list of fully qualified domain names (FQDNs) to which it is connected. A FQDN, which is also referred to as an "absolute domain name," is a domain name that specifies its exact location in a tree hierarchy of a Domain Name System (DNS). It specifies all domain levels, including the top-level domain, relative to a root domain. For example, given a device with a local hostname myhost, and a parent domain name example.com, the FQDN is written as myhost.example.com. This FQDN therefore uniquely identifies the host while there may be many resources in the world called myhost, there is only one myhost.example.com.

Thus, for example, assume that a resolver that implements the mechanisms of the illustrative embodiments is present on a host system, or node, such as client device 110 in FIG. 1, which may be a data processing device such as that shown in FIG. 2, for example. The resolver configuration file, resolv.conf, of this resolver includes a new directed referred to herein as the "domains-within-site" directive. An example of such a resolv.conf file may be as follows:

```
/etc/resolv.conf
domain us.ibm.com
search us.ibm.com
domains-within-site us.ibm.com in.ibm.com
nameserver 1.1.1.1
```

Using the mechanisms of the illustrative embodiments, assume that a resolver needs to resolve the host name dummy.in.ibm.com. The resolver will contact the global DNS server for us.ibm.com and will return two addresses, i.e. a regular global address as is generally returned in known mechanisms, as well as a local address, such as a ULU address, which prior to the present invention was not able to be published to global DNS servers since there were no guarantees of uniqueness for such local addresses.

Using the domains-within-site directive of the resolv.conf file in the example above, the resolver knows that the domains that are local to the resolver include the domains us.ibm.com and in.ibm.com. The FQDN of the hostname that is the subject of the name resolution, i.e. dummy.in.ibm.com, may be compared against the list of local domains returned by the directive domains-within-site to determine if the domain of the FQDN of the hostname being resolved matches one of the domains returned by the domains-within-site directive. In this example, dummy.in.ibm.com has the same domain as in.ibm.com returned by the domains-within-site directive and thus, the resolver knows that the ULU address returned by the global DNS server is reachable from the host on which the resolver is present and thus, the ULU address may be used as the destination address.

As another example, assume that the hostname being resolved is dummy.eu.ibm.com. The global DNS server may again respond with both the global address and a ULU address. However, in this case, the domains-within-site directive informs the resolver that the ULU address is not from the site in which the resolver's host is present. Therefore, the ULU address is not reachable from the host on which the resolver is present. In this case, rather than using the ULU address as the destination address, the regular global address is used as the destination address.

It should be noted that not all computing devices need to access a wide area network, such as the Internet, but instead only need local communication, such as for testing, installation, and other tasks within a site. Only a relative few nodes of a site need to be connected to the wide area network, e.g., Internet, and need to use global addresses. Planning and site setup becomes easier if one only has to work with local addresses for the majority of computing devices as opposed to global addresses, e.g. one does not need to worry about global routing prefixes while constructing sets of IP addresses to be allocated to each node. Hence, for many nodes within a site, the local addresses and ULU addresses are much more efficient for communication with these nodes as opposed to the global addresses of the few nodes that are actually coupled to the wide area network, e.g., the Internet.

Thus, with the mechanisms of the illustrative embodiments, ULU addresses may be registered in global DNS servers while having the reachability of the devices associated with these ULU addresses being resolved by the resolver when performing domain name resolutions. Such resolutions can determine whether to use the ULU address, when it is determined that the resolver is within the same site as the domain name being resolved, or a global address in the event that the domain name being resolved is not within the same site as the resolver.

Figure 4:
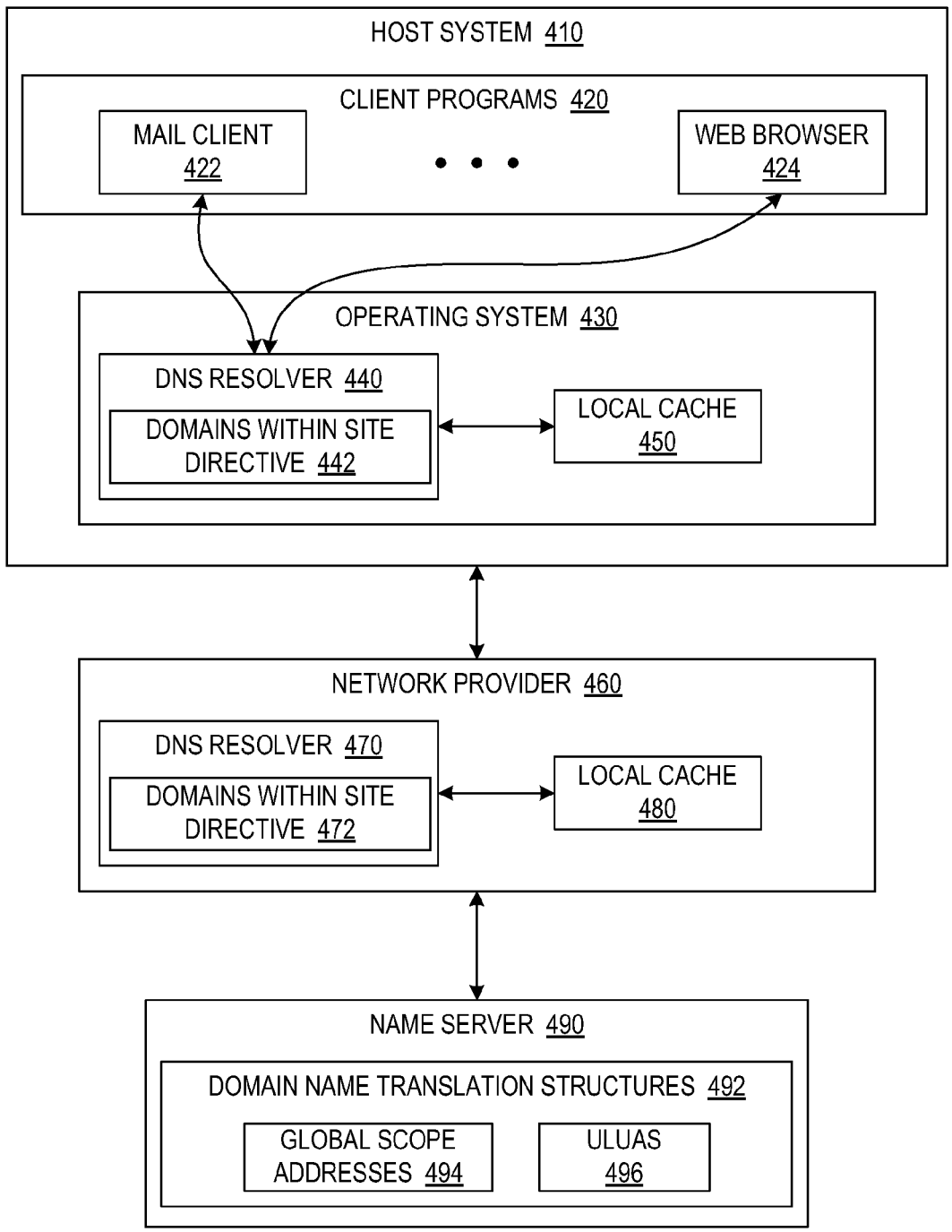
FIG. 4 is an example block diagram of the primary operational elements of a system for resolving domain names in accordance with one illustrative embodiment.

FIG. 4 is an example block diagram of the primary operational elements of a domain name resolution mechanism in accordance with one illustrative embodiment. As shown in FIG. 4, a host system 410 may include a plurality of client programs 420, such as mail client program 422, web browser 424, and the like. The host system 410 further includes an operating system 430 that includes a DNS resolver 440 having, in accordance with the mechanisms of the illustrative embodiments, a domains-within-site directive 442. The DNS resolver 440 may have an associated local cache 450 for storing recent address resolutions for quicker access to such addresses.

A network provider server 460 may be provided, such as an Internet Service Provider (ISP) or other server that connects the host system 410 to a local site network, external network, or the like. The network provider server 460 may also have a DNS resolver 470 having a similar domains-within-site directive 472 and local cache 480. That is, the mechanisms of the illustrative embodiments may be implemented in the host system 410 and/or in the network provider server 460.

The network provider server 460 may itself be coupled to a name server 490, such as via one or more data networks (not shown), which provides domain name translations, i.e. from an alphanumeric domain name to an IP address or vice versa. The name server 490 may store domain name translation data structures 492 in a local storage device or an attached storage device (not shown). In accordance with the mechanisms of the illustrative embodiments, the name server 490 may store not only global scope addresses 494 in the domain name translation data structures 492 but also local addresses, such as unique local unicast addresses (ULUAs) 496. Logic within the name server 490 provides the ability for the name server 490 to not only return global scope addresses 494 in response to requests for domain name translations, or resolutions, but also to provide the ULUAs 496 as well, when such a ULUA associated with a domain name is present in the domain name translation structures 492.

Often, users do not communicate directly with the DNS resolvers 440 in the host system 410 (although it is possible though some resolver programs such as nslookup and dig, for example). Instead, DNS resolution often takes place transparently in client programs 420, such as web browser 424, electronic mail client program 422, and other Internet applications. When client program 420 makes a request that requires a domain name lookup operation, such client programs 420 send a resolution request to the DNS resolver 440 in the local operating system 430, which in turn handles the communications required.

The DNS resolver 440 may have a local cache 450 containing the results of recent domain name lookup operations. If the local cache 450 can provide the requested domain name lookup result for the request, the DNS resolver 440 may return the IP address value in the local cache 450 to the requesting client program 420. If the local cache 450 does not contain the result of the domain name lookup operation for the request from the client program 420, the DNS resolver 440 sends the request to one or more designated name provider servers 460. Alternatively, the network provider server 460 may provide the DNS server capabilities in some embodiments. In other illustrative embodiments, the DNS resolver 470 on the network provider server 460 may provide the functionality of the illustrative embodiments for resolving domain names to IP addresses and vice versa.

As mentioned above, the DNS resolvers 440 and 470 may be configured, such as in the resolv.conf file, with a new directive that may be used to obtain the listing of local domains reachable from within a site, e.g., the domains-within-site directive. The particular listing of domains may be populated in the resolv.conf file or other storage data structure of the DNS resolver 440, 470 either manually by a system administrator, site administrator, domain administrator or the like, or by way of an automated discover process that may query computing devices within a site to obtain information regarding their assigned domains. In one illustrative embodiment, once the definitions of the domain and sub-domains are completed, such as by a system administrator or the like, a script can be used to perform the operation of placing these domain and sub-domain designations in the domains-within-site directive of the resolv.conf file. In other illustrative embodiments, the resolv.conf file may be manually written by system administrators.

In addition, the local addresses, e.g., ULUAs 496, for devices within a site may be installed, as any normal global scope unicast address 494, in translation data structures 480 of a global DNS server 470 associated with the site. For example, such installation may involve manual entries to the DNS database files, using a name server update program utility provided by the domain name server software package, or utilizing automated mechanisms such as scripts and the like that may update the domain name server database files. The global DNS server 490 returns both global scope addresses 494 and local addresses, e.g., ULUAs 496, in response to requests for domain name translations or resolutions.

The DNS resolvers 440 and 470 may make domain name translation or resolution requests to the DNS server 490 and receive responses from the DNS server 490 that contain both normal global scope unicast addresses 494 and, if they exist for the particular domain name that is the source of the request, one or more local addresses 496. The DNS resolver 440 and 470 resolver code is configured to do the following operations when handling such local addresses, e.g. ULUA addresses 496, contained in DNS response packets from the DNS server 470. Initially, the DNS resolver 440 and 470 compares the local address with the domains listed in the domains-within-site directive 442 of the DNS resolver 440. If a match is found, i.e. the domain of the local address matches one of the domains in the domains-within-site directive 442, then the local address belongs to one of the devices in a domain located in the same site as the DNS resolver 440, 470. As a result, the client program 420 originating the request can use the local address in its communication as this communication is within the site.

If a match is not found, then the local address belongs to a domain outside the local scope of the DNS resolver 440, 470 site. The DNS resolver 440, 470 has logic for filtering out or removing these local addresses from responses to client programs 420 before presenting the results to the client programs 420.

The DNS resolver 440, 470 may further have sort logic in the directive for sorting global and local addresses returned from DNS servers 470 according to whether the addresses are global or local in scope. For example, a first sort operation, e.g., sortlist global ulua, may present all global addresses ahead of ULUAs since a requesting client program 420 normally uses the first address among all addresses returned. As a result of this sort operation, the global address will be used. A second sort operation, e.g., sortlist ulua global, may present local addresses, e.g., ULUAs, ahead of global addresses. Thus, for example, if it is determined that a match occurs between the domain of the original domain name that is the subject of the name resolution and the domain names listed in the DNS resolver domains-within-site listing, then the sortlist ulua global may be used to present ULUAs ahead of the global addresses. If there is not a match, then the sortlist global ulua may be used to present the global addresses ahead of the ULUAs. Thus, the DNS resolvers 440, 470 facilitate specifying destination address selection rules regarding the selection of ULUAs over global unicast addresses or vice versa. Various rules for source and destination address selection are explained in IPv6 RFC 3484.

It should further be appreciated that reverse queries, i.e. address to name queries as opposed to the name to address queries, may also be facilitated on the global DNS server using local addresses, e.g., ULUAs, through the mechanisms of the illustrative embodiments. For example, local addresses may be preferred in local communication only if domain names received in response match with the DNS resolver's domain using the rules described above. Moreover, the mechanisms of the illustrative embodiments are not limited to single sites but can be extended to interconnected sites where the domains under all, or at least a subset, or the connected sites are listed in the new directive, e.g., the domains-within-site directive.

Figure 5:
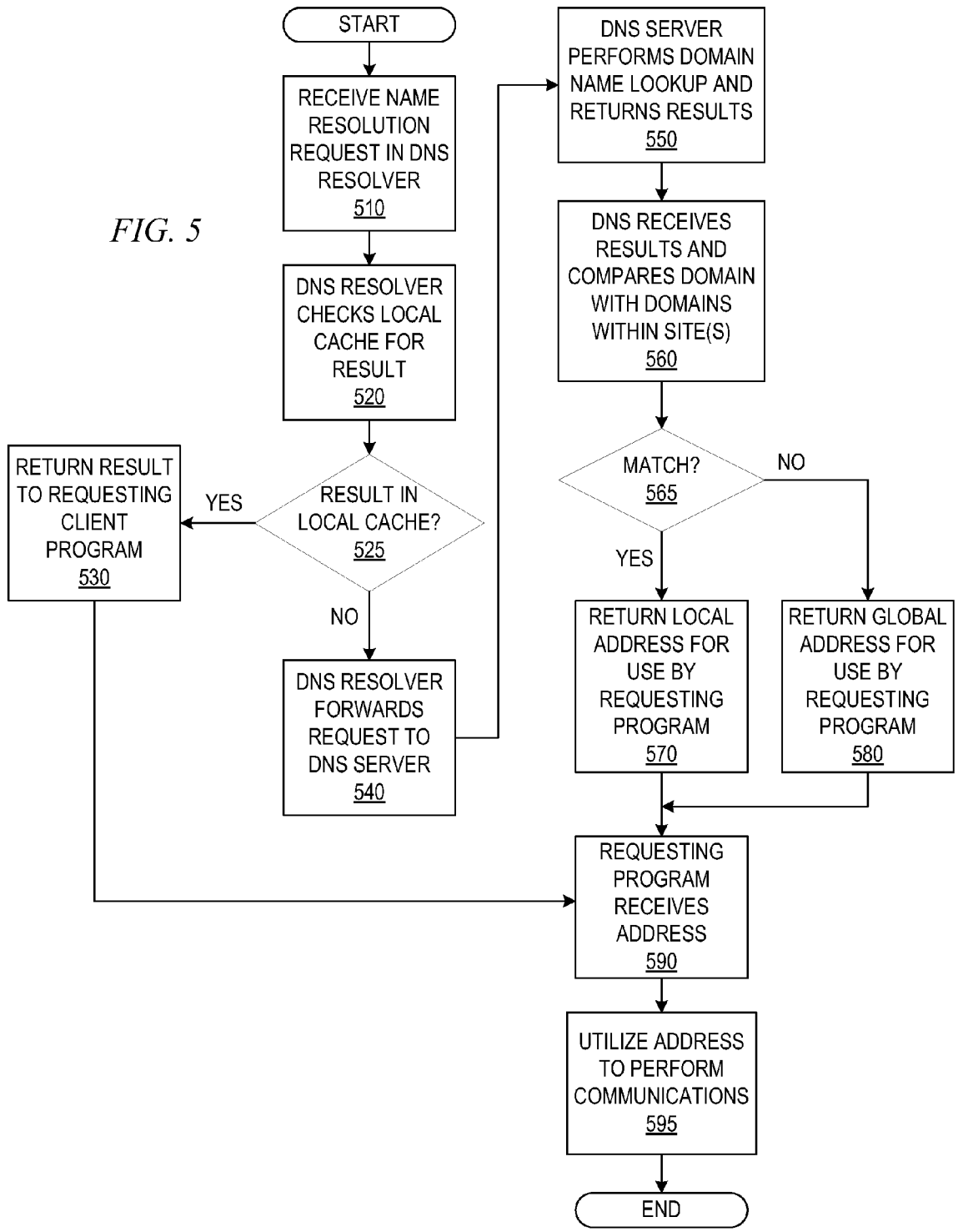
FIG. 5 is a flowchart outlining an example operation of a resolver in accordance with one illustrative embodiment.

FIG. 5 is a flowchart outlining an example operation of a DNS resolver in accordance with one illustrative embodiment. As shown in FIG. 5, the operation starts with a name resolution request being received in the DNS resolver from a client program, e.g., an Internet browser, electronic mail program, or the like (step 510). The name resolution request includes an alphanumeric domain name that is to be resolved into an IP address. The DNS resolver checks a local cache for a result of the name resolution request (step 520). If the name has been resolved recently and the result is in the local cache, then the result is returned to the DNS resolver which presents the result to the requesting client program (step 530).

If the name has not been resolved recently or if the result is not still in the local cache, then the DNS resolver forwards the name resolution request to a DNS server specified in a resolver configuration file (step 540). The DNS server performs the domain name lookup operation in translation data structures of the DNS server and returns the results of the name resolution operation to the DNS resolver (step 550). The results, in accordance with the mechanisms of the illustrative embodiments, may include both a global scope address and a local address, e.g., a unique local unicast address (ULUA).

The DNS resolver receives the results of the name resolution operation from the DNS server and determines if there is a match between a domain of a local address, e.g., ULUA, returned in the result and a domain that is part of the site, or a related site, corresponding to the DNS resolver (step 560). In order to make such a determination, the DNS resolver may utilize the new directive, e.g., domains-within-site directive, which may be provided in the resolver configuration file, to perform a comparison of the domain of the local address with the domains of the site or related sites. If there is a match, then the local address, e.g., ULUA, is returned by the DNS resolver to the requesting client program as the address to be used for communication (step 570). This may involve, for example, performing a sort operation to sort the addresses returned in the result from the DNS server such that the local address is listed before any global address. Otherwise, if there is not a match, then the local address is not utilized and the global address is returned by the DNS resolver to the requesting client program as the address to be used for communication (step 580). This may involve actually filtering out the local address from the returned results, performing a sort operation to sort the addresses such that global addresses are listed prior to any local addresses, or the like.

The requesting client program receives the results of the domain name resolution (step 590) and utilize the results to perform communications with the device corresponding to the original domain name sent in the original request (step 595). The operation then terminates.

Thus, the illustrative embodiments provide mechanisms for allowing local addresses to be published to global name servers such that they may be returned in results of domain name resolution operations. Moreover, the illustrative embodiments provide mechanisms for determining whether a local address returned from a name server is within a domain of a site associated with the device upon which the resolver is present, i.e. whether the device corresponding to the local address is reachable from the device upon which the resolver is present. If so, then the local address may be used for communications, otherwise the global address is used.

To illustrate the benefits of using the local address as opposed to the global address, assume a site of hundreds of nodes, the majority of which do not require any Internet connectivity. These nodes that do not require Internet connectivity are configured with local addresses, e.g., ULUAs (one such node is referred to hereafter as node X). Assume also that only 1 or 2 nodes (assume running global DNS) and need global IP addresses for accessing the Internet (one such node is referred to herein as node G). When node X communicates with node G, X (having IP=ULUA only) will not prefer using node G's global IP address because the destination IP address for node G is larger in scope than its own source IP address=ULUA.

In other words, nodes should not use a higher scope IP address than their own source scope address, as the destination IP address of their communications. Otherwise, the node could send a packet into other scopes that is so long that node G cannot respond back. To clarify further, imagine if node G belongs to another site itself and node X is using node G's global IP address for communications. In this case, node X could send a packet to node G anywhere in Internet. Node G may not be able to respond back to node X with its site ULU address as ULUA will not escape node G's site. So nodes prefer using destination addresses either equal in scope or less in scope with respect to their own source address.

The mechanisms above are utilized so that local addresses, such as ULUAs, may be published to global name servers and returned by global name servers in response to name resolution requests from resolvers even though ULUAs are not guaranteed to be unique. The mechanisms ensure that a possibly non-unique local address can be used by the device associated with the resolver by checking the domain of the local address and the domains of the site or associated sites of the resolver. However, if it were possible to ensure the uniqueness of the local address, such mechanisms would not be necessary. In a further illustrative embodiment, mechanisms are provided for ensuring the uniqueness of the local addresses so that they can be returned by name servers and used by devices to perform communications without having to perform the domain checks mentioned above.

Figure 6:
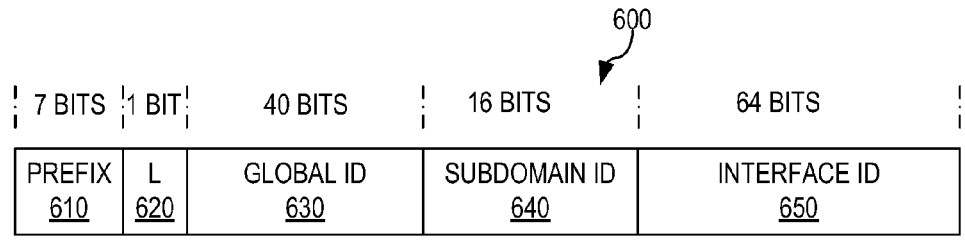
FIG. 6 is an example diagram of a unique local unicast address (ULUA) in accordance with one illustrative embodiment.

FIG. 6 is an example diagram of a unique local unicast address (ULUA) in accordance with one illustrative embodiment. As shown in FIG. 6, the ULUA 600 includes a prefix 610, a local bit L 620, a global identifier (ID) 630, a subnet or sub-domain identifier (ID) 640, and an Interface identifier (ID) 650. The prefix 610 may be used to identify different types of addresses, such as a unique local unicast address (ULUA). For example, the prefix FC00::/7 may be used to designate a ULUA. The local bit 620 may be set to 1 if the prefix is locally assigned, e.g., if the prefix is a ULUA prefix. The setting of this local bit 620 to 0 is not presently utilized other than to be a state for a nonlocal prefix but may be defined for further functionality in the future.

The global ID 630 is a global identifier used to create a globally unique prefix. The sub-domain ID 640 is an identifier of a sub-domain or subnet within a site. The interface ID 650 is a value that uniquely identifies a given node within the specified network (by using network id).

The global ID 630 is the field in the address 600 that is designed to ensure the uniqueness of the address. However, in practice, the method for generating global IDs 630 defined in the IPv6 specification only ensures that the global IDs 630 are "most likely unique" and thus, there is a small possibility that the global ID 630 is not unique. The reason that these global IDs 630 are not guaranteed to be unique is that they are generated in a decentralized fashion with no central authority ensuring that the global IDs 630 are unique. Without a guarantee of uniqueness, as mentioned above, these addresses cannot be registered in the global name servers because of the chance of collisions.

In a further illustrative embodiment, the generation of the global IDs 630 through the global name servers is centralized through one or more domain name registrars that operate as the central authority that guarantees global ID uniqueness. The domain name registrars assign and register one global ID per domain name. A local address, or unique local unicast address (ULUA) field may also be added to the name server record so that the global ID for a domain can be retrieved via the name server. Essentially, this helps avoid misrepresentation by sending spoofed packets or the like. This is just to ensure that anyone (even the user) can quickly check the domain name and associated global id, such as by using an interface program, script, or the like.

In a case where there may be more than one registrar utilized, these registrars may communicate with one another to update their registries of global IDs so that the registrars do not duplicate global IDs when assigning and registering new domains. Such communication may occur periodically or upon the occurrence of particular events, such as the assigning of a new global ID and registration of a new domain, for example.

Thus, there is a one-to-one mapping of domain names maintained by the registrars with global IDs 630. In this way, the global IDs 630 are essentially "domain IDs" in that they uniquely identify a particular domain. With the sub-domain ID field 640, an organization, i.e. domain name owner, can create a one-to-one mapping of sub-domain IDs to sub-domain names. That is, system administrators responsible for an organization or site may create unique sub-domain ids for each for their sub-domains within their domains. They can do so manually or automatically as they please, such as by using interface programs, automatically executing scripts or programs, or the like. The sub-domain names to sub-domain id mapping may be maintained in software and/or hardware that generates the ULUA within sub-domains. For example, ndpd-host is one software utility that can assist in generating link local addresses/global addresses for IPv6. Similar programs can remember this mapping while generating ULUAs on a particular node considering its sub-domain characteristics.

The sub-domain ID 640 is part of the local address portion of the address 600. Thus, both the domain and the local address portion of the address are guaranteed to be unique to the domain and sub-domain and, as a result, the address 600 as a whole may be guaranteed to be unique. That is, the network portion of the address has 64 bits (high order bits)–prefix+L bit is constant. The illustrative embodiments ensure that the global id is unique for given domains (dns registration process ensures this). The sub-domain id is unique within the global id (site administration ensures this) so that the whole IPv6 address 600 is unique if one looks at the address 600 in hierarchical order. Since the address 600 is guaranteed to be unique, it can be used in a global name server and may be provided to devices as part of a name resolution operation for use in their communications without a concern that an address collision may occur.

Figure 7:
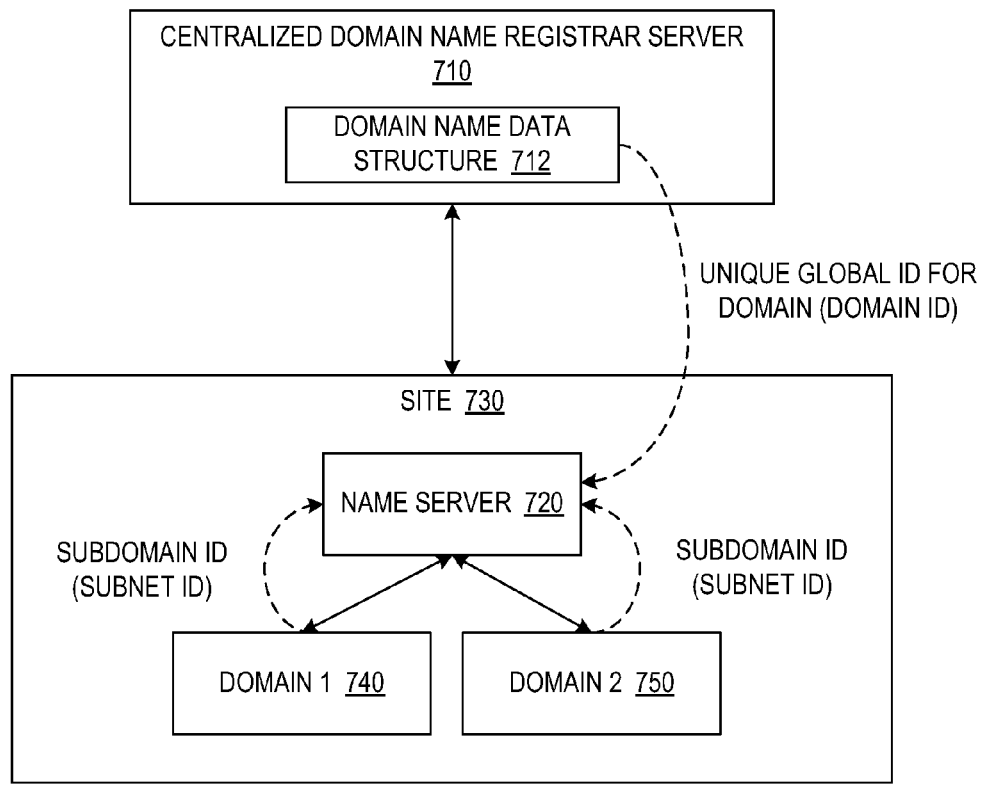
FIG. 7 is an example diagram of the primary operational elements according to this alternative illustrative embodiment for registering unique global IDs in association with site domains.

FIG. 7 is an example diagram of the primary operational elements according to this alternative illustrative embodiment for registering unique global IDs in association with site domains. As shown in FIG. 7, the primary operational elements include a centralized domain name registrar server 710 that registers domain names, e.g., ibm.com, in a domain name data structure 712 and assigns a unique global ID to each of the domain names registers in the domain name registrar server 710. A name server 720 associated with the site 730 is informed of the global ID, or domain ID, assigned to the domain of the site 730 by the centralized domain name registrar server 710. The site administrator may then divide the site into sub-domains 740-750, e.g., us.ibm.com, in.ibm.com, etc. The site administrator may assign a unique sub-domain ID to each sub-domain 740-750 within the site 730 and these sub-domain IDs may be registered with the name server 720. The name server 720 may then provide the global ID and subnet IDs for domain and sub-domains to the routers in the site 730 such that they can assign appropriate addresses to devices coupled to the routers. As a result, each device in the site has a guaranteed unique address.

Figure 8:
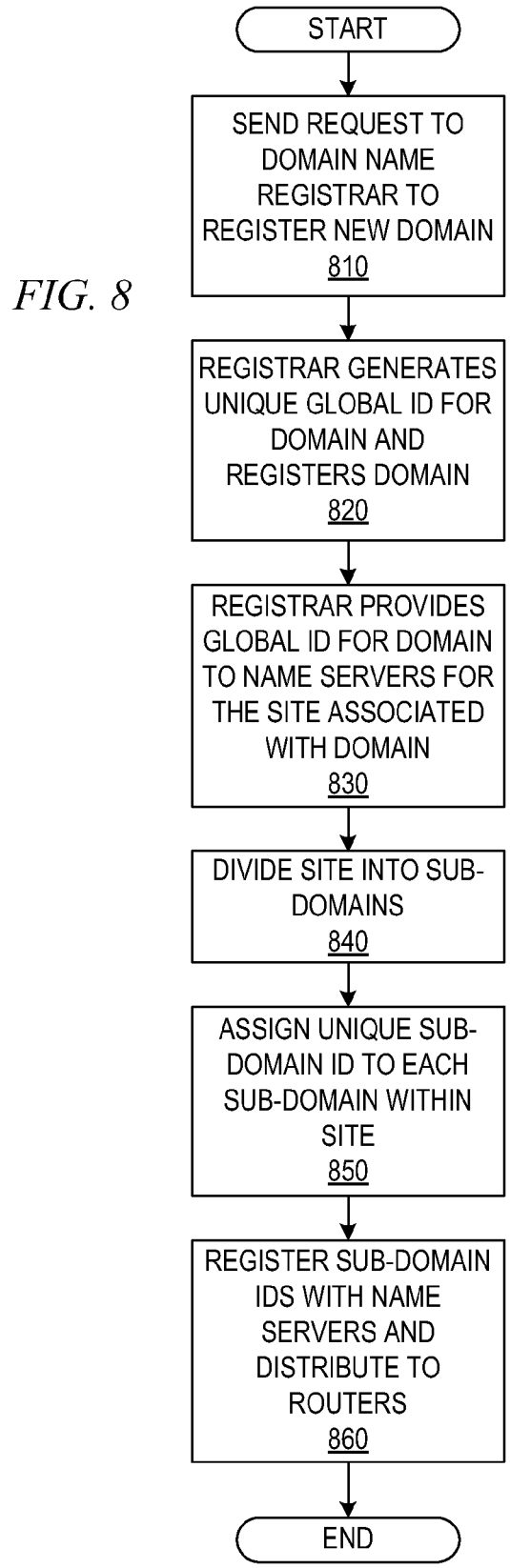
FIG. 8 is a flowchart outlining an example operation for generating a guaranteed unique local unicast address in accordance with one illustrative embodiment.

FIG. 8 is a flowchart outlining an example operation for generating a guaranteed unique local unicast address in accordance with one illustrative embodiment. As shown in FIG. 8, the operation starts by sending a request to a domain name registrar to register a new domain with the domain name registrar (step 810). The domain name registrar generates a unique global ID for the domain and registers it along with the domain name in the domain name registrar (step 820). The domain name registrar provides the global ID for the domain to the name servers for the site associated with the domain (step 830). The site administrator divides the site into sub-domains (step 840) and assigns a unique sub-domain ID to each sub-domain within the site (step 850). The unique sub-domain IDs are registered with the name servers of the site which then send the global ID and sub-domain IDs to the routers of the site so that they can use these IDs in assigning unique addresses to devices associated with the routers (step 860). The operation then terminates.

With regard to the use of the ULUA once it is generated, the operation for using the ULUA would essentially be the same as described above with regard to FIG. 5 but without the need to perform the checks with regard to reachability based on the ULUA, e.g., steps 560-580. Such checks are not necessary since the ULUA is guaranteed to be unique using this additional illustrative embodiment.

Thus, in addition to providing mechanisms for ensuring unique local addresses by checking the domains that are within a site, further illustrative embodiments may ensure unique local addresses by centralizing the generation of global IDs and sub-net IDs. In this way, the uniqueness is guaranteed at the time that the addresses are generated rather than having to guarantee the uniqueness at the time of name resolution.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for assigning addresses for use in communications between computing devices, comprising:

assigning, by a centralized domain name registrar server, a unique global identifier to a domain of a site such that the unique global identifier uniquely identifies the domain;

receiving the unique global identifier in the data processing system from the centralized domain name registrar server;

dividing the site into a plurality of sub-domains;

assigning a unique sub-domain identifier to each sub-domain in the site such that the unique sub-domain identifier uniquely identifies a corresponding sub-domain in the site;

providing the global identifier for the domain of the site and the sub-domain identifiers of the sub-domains in the plurality of sub-domains to routers of the site for use in associating addresses with devices of the site;

storing, in a global name server, addresses generated by the routers based on the unique global identifier and unique sub-domain identifiers; and providing, by the global name server as part of a name resolution operation, the addresses generated by the routers to the devices for use in communications associated with the devices.

2. The method of claim 1, wherein the data processing system comprises a plurality of centralized domain name registrar servers, and wherein the plurality of centralized domain name registrar servers communicate with one another to ensure that global identifiers assigned by any one of the centralized domain name registrar servers is not duplicated by any other centralized domain name registrar server when assigning global identifiers to domains.

3. The method of claim 1, wherein at least one of the domain identifier or the sub-domain identifiers are generated and assigned automatically without human intervention.

4. The method of claim 1, further comprising:

assigning, by a router of the site, an address to a device within the site, based on the unique global identifier and a unique sub-domain identifier for a sub-domain in which the device is present in the site, wherein the assigned address is a local address that is not global in scope.

5. The method of claim 4, wherein the local address is a unique local unicast address (ULUA) having a first portion of the ULUA including the unique global identifier of the domain of the site, and a second portion of the ULUA including the sub-domain identifier of the sub-domain in which the device is present.

6. A method, in a data processing system, for assigning addresses for use in communications between computing devices, comprising:

assigning, by a centralized domain name registrar server, a unique global identifier to a domain of a site such that the unique global identifier uniquely identifies the domain;

receiving the unique global identifier in the data processing system from the centralized domain name registrar server;

dividing the site into a plurality of sub-domains;

assigning a unique sub-domain identifier to each sub-domain in the site such that the unique sub-domain identifier uniquely identifies a corresponding sub-domain in the site;

providing the global identifier for the domain of the site and the sub-domain identifiers of the sub-domains in the plurality of sub-domains to routers of the site for use in associating addresses with devices of the site; and assigning, by a router of the site, an address to a device within the site, based on the unique global identifier and a unique sub-domain identifier for a sub-domain in which the device is present in the site, wherein the assigned address is a local address that is not global in scope.

7. The method of claim 6, wherein the local address is a unique local unicast address (ULUA) having a first portion of the ULUA including the unique global identifier of the domain of the site, and a second portion of the ULUA including the sub-domain identifier of the sub-domain in which the device is present.

8. The method of claim 6, further comprising:

storing, in a global name server, addresses generated by the routers based on the unique global identifier and unique sub-domain identifiers and providing, by the global name server as part of a name resolution operation, the addresses generated by the routers to the devices for use in communications associated with the devices.

9. The method of claim 6, wherein the data processing system comprises a plurality of centralized domain name registrar servers, and wherein the plurality of centralized domain name registrar servers communicate with one another to ensure that global identifiers assigned by any one of the centralized domain name registrar servers is not duplicated by any other centralized domain name registrar server when assigning global identifiers to domains.

10. The method of claim 6, wherein at least one of the domain identifier or the sub-domain identifiers are generated and assigned automatically without human intervention.

11. A method, in a data processing system, for assigning addresses for use in communications between computing devices, comprising:

assigning, by a centralized domain name registrar server, a unique global identifier to a domain of a site such that the unique global identifier uniquely identifies the domain;

receiving the unique global identifier in the data processing system from the centralized domain name registrar server;

dividing the site into a plurality of sub-domains;

assigning a unique sub-domain identifier to each sub-domain in the site such that the unique sub-domain identifier uniquely identifies a corresponding sub-domain in the site;

providing the global identifier for the domain of the site and the sub-domain identifiers of the sub-domains in the plurality of sub-domains to routers of the site for use in assigning addresses to devices of the site;

storing, in a global name server, addresses generated by the routers based on the unique global identifier and unique sub-domain identifiers; and performing communications between the devices of the site using the addresses assigned by the routers based on the unique global identifier and unique sub-domain identifiers.

12. The method of claim 11, further comprising:

assigning, by a router of the site, an address to a device within the site, based on the unique global identifier and a unique sub-domain identifier for a sub-domain in which the device is present in the site, wherein the assigned address is a local address that is not global in scope.

13. The method of claim 12, wherein the local address is a unique local unicast address (ULUA) having a first portion of the ULUA including the unique global identifier of the domain of the site, and a second portion of the ULUA including the sub-domain identifier of the sub-domain in which the device is present.

14. The method of claim 11, wherein the data processing system comprises a plurality of centralized domain name registrar servers, and wherein the plurality of centralized domain name registrar servers communicate with one another to ensure that global identifiers assigned by any one of the centralized domain name registrar servers is not duplicated by any other centralized domain name registrar server when assigning global identifiers to domains.

15. The method of claim 11, wherein at least one of the domain identifier or the sub-domain identifiers are generated and assigned automatically without human intervention.

16. The method of claim 11, further comprising providing, by the global name server, the addresses generated by the routers to the devices as part of a name resolution operation for use in communications associated with the devices.

* * * * *